United States Patent [19]

Borman

[11] 4,147,738
[45] Apr. 3, 1979

[54] PROCESS FOR THE SOLID STATE POLYMERIZATION OF BRANCHED POLY(ALKYLENE TEREPHTHALATES) USING AROMATIC POLYCARBONATES

[75] Inventor: Willem F. H. Borman, Evansville, Ind.

[73] Assignee: General Electric Company, Pittsfield, Mass.

[21] Appl. No.: 756,644

[22] Filed: Jan. 4, 1977

[51] Int. Cl.$^2$ .................. C08L 67/02; C08L 69/00
[52] U.S. Cl. ................................................. 260/860
[58] Field of Search .................. 260/860, 75 M, 75 T

[56] References Cited
U.S. PATENT DOCUMENTS

| | | | |
|---|---|---|---|
| 3,218,372 | 11/1965 | Okamura et al. | 260/860 |
| 3,692,744 | 9/1972 | Rich et al. | 260/75 T |
| 3,752,866 | 8/1973 | Doerr | 260/860 |
| 3,915,926 | 10/1975 | Wambach | 260/860 |
| 3,953,404 | 4/1976 | Borman | 260/75 M |
| 3,960,817 | 6/1976 | Morawetz et al. | 260/75 T |
| 3,998,908 | 12/1976 | Buxbaum | 260/860 |
| 4,069,278 | 1/1978 | Borman et al. | 260/860 |

Primary Examiner—Howard E. Schain
Attorney, Agent, or Firm—Morgan, Finnegan, Pine, Foley & Lee

[57] ABSTRACT

An improved process for the solid state polymerization of branched copoly(alkylene terephthalates) comprises carrying out the polymerization of the branched copolyester in intimate admixture with a small amount of an aromatic (poly-) or (copoly-)carbonate resin in an inert atmosphere. The aromatic (poly-) or (copoly-)carbonate resin accelerates the achievement of high melt viscosity.

15 Claims, No Drawings

PROCESS FOR THE SOLID STATE POLYMERIZATION OF BRANCHED POLY(ALKYLENE TEREPHTHALATES) USING AROMATIC POLYCARBONATES

This invention relates to an improved process of preparing higher molecular weight branched copoly(alkylene terephthalates). More particularly, it provides an improved procedure for the solid state polymerization of branched copoly(alkylene terephthalates) of high melt viscosity in shorter reaction times by adding a minor amount of aromatic (poly-) or (copoly-)carbonate to the polymer before heating the solid in an inert atmosphere.

BACKGROUND OF THE INVENTION

Articles manufactured from poly(alkylene terephthalates) have many valuable characteristics, including strength, toughness, solvent resistance, high gloss, and the like. These articles may be fabricated by a number of well known techniques, including injection molding, roto molding, blow molding, extrusion, and the like, depending on the shape of the desired product.

Certain of these techniques, in particular, blow molding and extrusion, require that the molten poly(alkylene terephthalate) have a suitably high melt viscosity, e.g., in excess of 10,000 poises, to prevent collapse or blowouts in the soft preformed state. It has been found that poly(alkylene terephthalates) of such high melt viscosity are obtained only with great difficulty in the conventional bulk melt polymerization processes generally used to prepare the polyester.

It is easier to achieve high melt viscosities if a small amount of a tri- or higher functional ester-forming branching component is included in the polyester, and still easier if the branched copolyester is subjected to solid state polymerization, i.e., heating particles of the resin at a temperature of above 150° C. and below the sticking point of the particles, in an inert atmosphere or under a vacuum.

It has now been discovered that branched copoly(alkylene terephthalates) of high melt viscosity can be obtained in reduced reaction period if a small amount of an aromatic (poly-) or (copoly-)carbonate resin, e.g., a bisphenol-A (poly-)carbonate, or a bisphenol-A/tetrabromobisphenol-A (copoly-)carbonate, is intimately blended with the branched copolyester before solid state polymerization.

The amounts of added aromatic (poly-) or (copoly-)carbonate can have a similar effect in different degrees. Low concentrations, e.g., 0.1 to 5 percent by weight, have a minimum effect on product properties, while larger concentrations, e.g., up to 15 or even 20 percent by weight, in addition to reducing the reaction time, lead to interesting and important products of lower crystallinity, higher impact strength and increased flexibility.

DESCRIPTION OF THE INVENTION

According to the present invention, there is provided an improved method for the preparation of a high melt viscosity branched copoly(alkylene terephthalate) and from 0.01 to 3 mole percent, based on the terephthalate units, of units of a branching component which contains at least three ester-forming groups, said branched polyester having a melt viscosity of greater than about 10,000 poises, said process comprising:

(a) forming an intimate blend of a corresponding, normally solid branched copolyester having a melt viscosity of below about 3,000 poises and from 0.1 to 5.0 percent by weight of an aromatic (poly-) or a (copoly-)carbonate resin and transforming said blend into a solid particulate state; and (b) heating the particles of solid branched copolyester-aromatic (poly)- or (copoly-)carbonate blend at a temperature of above 150° C. and below the melting point of said polyester in the presence of an inert gas until the desired degree of increase in melt viscosity is obtained.

The melt viscosity is determined under the conditions specified in the example. Typically, a "high melt viscosity" resin is of greater than about 7,500 poises and generally in excess of about 10,000 poises at 250° C. A specific polyester according to this invention is one having a melt viscosity of greater than 15,000 poises.

The polyester resins with which this invention is concerned are, in general, saturated condensation products of $C_2$–$C_{10}$ glycols, e.g., ethylene glycol, propylene glycol, butanediol-1,4, hexanediol-1,6, decanediol-1,10, cyclohexane-1,4-dimethanol, and the like, and terephthalic acid, or reactive derivatives thereof, e.g., dimethyl terephthalate. In addition to the terephthalic acid units, other dicarboxylic acid units, such as adipic, naphthalene dicarboxylic, isophthalic and orthophthalic units may be present in small amounts, e.g., from about 0.5 to about 15 mole percent of the total acid units.

The branched high melt viscosity poly(alkylene terephthalate) resins include a small amount of a branching component containing at least three ester-forming groups. The branching component can be one which provides branching in the acid unit portion of the polyester, or in the glycol unit portion, or it can be a hybrid. Illustrative of such branching components are tri- or tetracarboxylic acids, such as trimesic acid, pyromellitic acid, and lower alkyl esters thereof, and the like, or preferably, polyols, and especially preferably, tetrols, such as pentaerythritol; triols, such as trimethylolpropane; or dihydroxy carboxylic acids and hydroxydicarboxylic acids and derivatives, such as dimethyl hydroxyterephthalate, and the like.

The branched copolyesters are used as starting materials because the final properties are far better than linear polyesters for a broad number of uses where high melt strength is important. Moreover, such branched materials reach a higher melt viscosity more rapidly than the unbranched materials when used in solid state processes.

The relative amount of branching component can vary, but is always kept at a minor proportion, e.g., of up to 5 mole percent maximum, for every 100 moles of the terephthalate units in the branched polyester. Preferably, the range of branching component included in the esterification mixture (and, generally, that included in the starting material), will be from 0.01 to 3 mole percent, based on the terephthalate units. Especially preferably, it will comprise from about 0.02 to about 1 mole percent, based on the terephthalate component.

Processes for preparing the branched polyester starting materials used in this process are well known to those skilled in the art. The description in U.S. Pat. No. 3,692,744 is helpful.

The general procedure for making the starting resins is a condensation in the melt state, using an excess of the alkanediol to the dialkyl terephthalate or terephthalic acid and the desired branching component. Heat (250° to 260° C.) and high vacuum (0.2 to 1.0 mm Hg) are used for a long enough time, e.g., 3 to 12 hours, to build the molecular weight by eliminating volatile by-products. It has been found that the resin used as starting material in this solid state process should be predominantly hydroxy terminated. It will be normally solid. The melt viscosity will be below about 3,000 poises, typically 1,000 to 2,000 poises.

A variety of aromatic (poly-) and (copoly-)carbonates are suitable. These are well known to those skilled in this art. They will be resins of the general formula:

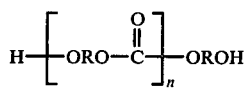

wherein R is a divalent aromatic radical, mono or polynuclear, like in the case of homopolymers and unlike in the case of copolymers, and n is of such a value as to cause the resin to be normally solid. Especially suitable is a bisphenol-A (copoly-)carbonate which can be made in known ways, e.g., by condensing bisphenol-A or a mixture of bisphenol-A and tetrabromobisphenol-A and phosgene. Such resins are also available from several commercial sources. As has been mentioned above, the amount used can vary from about 0.1 to 20 percent by weight, preferably 0.5 to 2 percent by weight, based on the combined weights of the aromatic polycarbonate and the branched copolyester. Also suitable are halo-substituted bisphenol-A polycarbonates.

The process of this invention is carried out in two steps, first, making an intimate blend of the branched polyester and the aromatic polycarbonate, e.g., by co-extrusion, milling, intensive mixing, etc., and then transforming the polyester-polycarbonate blend to a solid particulate state and, second, heating the particles until the desired degree of increase in melt viscosity is obtained.

Experiments have shown that pellets, e.g., extruded and chopped cubes, cylinders, spheres, irregular shapes, and the like, of up to ¼ inch maximum dimension, react in the solid state as well as the ground polymer, in the long run. However, to obtain a more homogeneous polymer when using branched polyesters, grinding of the feed is preferable. It is convenient to grind the feed, e.g., by passing it through a mill with dry ice cooling, using a coarse screen.

Alternately, extruded pellets may be heated in a stream of hot inert gas containing a modifying amount of diol corresponding to the diol incorporated in the polyester. See, U.S. Pat. No. 3,953,404, which is incorporated herein by reference.

With respect to the heating stage, experiments have shown that solid state polymerization proceeds readily at temperatures above about 150° C. The rate is especially rapid at 200° C. or 210° C., and measurably slower at 150° C. or 160° C. Heating can be carried out between 150° and 210° C. The most preferred temperature range is between 180° C. and 210° C. and especially between 190° C. and 210° C.

The preferred inert gas is nitrogen, although if desired, argon, helium, carbon dioxide, or mixtures thereof with or without nitrogen may be employed. Up to 3,000 ppm of 1,4-butanediol may be added to the inert gas (no poly(1,4-butylene terephthalate) is used) to moderate the polymerization in order to obtain a more homogeneous product.

The particles can be in a fixed or fluidized bed during the heating step. The particles can be agitated in any conventional manner, if desired. A fluidizing stream of nitrogen can provide agitation, removal of volatiles and an inert atmosphere.

The time required for step (b) of the process can vary, depending on the temperature, the amount of aromatic polycarbonate resin in the particles and the melt viscosity desired. In general, it will be between about ½ hour and several days, e.g., up to 96 hours, or longer. In any event, however, the time will be measurably shorter than required with particles which do not contain any of the aromatic polycarbonate.

The polyester products of this invention can be combined with conentional additives, such as reinforcements, stabilizers, antioxidants, plasticizers, lubricity promoters, dyes, pigments, flame retardant additives, and the like. The products are useful for all fabricating purposes, but especially so for blow molding and extrusion and for foam fabrication purposes.

DESCRIPTION OF THE PREFERRED EMBODIMENTS

The following non-limiting examples illustrate the process of this invention.

EXAMPLE 1

A branched polyester is prepared from 1,4-butanediol and dimethylterephthalate, with the addition of 0.215 mole percent pentaerythritol. The melt viscosity is 1,700 poises (as measured at 250° C. in a capillary rheometer as described in ASTM D-1238).

A portion of the polyester is co-extruded with 1 percent by weight of a bisphenol-A polycarbonate resin (General Electric Company LEXAN 140 powder) and the extrudate is chopped into ⅛ inch cubes. The cubes are set in fluidized motion and heated in an appratus for solid state polymerization at 207° C. in an atmosphere of nitrogen containing 1,400 ppm of 1,4-butanediol. The pelletized product which initially has a melt viscosity of 2,400 poises after solid state polymerization for 2 hours and 40 minutes reaches a melt viscosity of 56,900, which is eminently suitable for blow molding, and similar fabrication techniques. For comparison purposes, the solid state polymerization is repeated on a branched copolyester without any aromatic polycarbonate resin being added thereto. In this case, even after 13 hours of reaction time, the melt viscosity has increased to only 41,400 poises from a starting viscosity of 1,700 poises.

EXAMPLE 2

The branched copolyester of Example 1 is extruded with 5 percent of the polycarbonate powder and pelletized. When subjected to the solid state polymerization process, the melt viscosity increases from 5,700 poises to 49,300 poises in 1 hour and 15 minutes.

EXAMPLE 3

A branched polyester of the type used in Example 1 is extruded with 1 percent polycarbonate resin (LEXAN 140) and heated to 202° to 205° C. in a fluidized bed in a nitrogen stream containing 1,340 ppm of butanediol vapor. The melt viscosity increases from 1,650 poises to 42,800 poises in 3¼ hours. When this example is repeated using pure $N_2$, free from added butanediol vapor, the melt viscosity increases to 43,500 poises in 3 hours, but the product is less homogeneous, resulting in greater surface roughness of an extruded strand.

For comparison purposes, a branched copolyester similar to the product used in Example 1, but with an initial melt viscosity of 1,400 poises, is heated in a fluidized bed solid state polymerization apparatus at 205° C. for 6 hours and 30 minutes. The fluidizing nitrogen gas contains 1,470 ppm 1,4-butanediol vapor. The melt viscosity of the polymer increases to 16,400 poises.

EXAMPLE 4

The procedure of Example 1 is repeated, substituting for the bisphenol-A (poly-)carbonate, a 1:1 bisphenol-A/tetrabromobisphenol-A (copoly-)carbonate prepared by a modified procedure according to A. D. Wambach, U.S. Pat. No. 3,915,926. Substantially the same results are obtained.

Obviously, other modifications and variations of the present invention are possible in the light of the above teachings. For example, instead of pentaerythritol as a branching component, there can be substituted trimethylolpropane and trimethyl trimesate. Instead of bisphenol-A polycarbonate resin, a hydroquinone polycarbonate or a tetrabromobisphenol-A polycarbonate resin can be used. It is, therefore, to be understood that changes may be made in the particular embodiment described which will be within the full intended scope of the invention as defined by the appended claims.

I claim:

1. An improved process for the preparation of a high melt viscosity hydroxy terminated branched copolyester comprising alkylene terephthalate units and from 0.01 to 3 mole percent, based on the terephthalate units, of units of a branching component which contains at least three ester-forming groups, said branched polyester having a melt viscosity of greater than about 10,000 poises, said process comprising:
   (a) forming an intimate blend of a corresponding, normally solid branched copolyester having a melt viscosity of below 3,000 poises and from 0.1 to 5.0 percent by weight of an aromatic (poly-) or (copoly-)carbonate resin and transforming said blend into a solid particulate state; and
   (b) heating the particles of solid branched copolyester-aromatic (poly-) or (copoly-)carbonate blend at a temperature of at least 150° C. and below the melting point of said polyester in the presence of an inert gas until the desired degree of increase in melt viscosity is obtained.

2. A process as defined in claim 1 wherein heating step (b) is carried out between 150° and 210° C.

3. A process as defined in claim 2 wherein heating step (b) is carried out between 180° and 210° C.

4. A process as defined in claim 3 wherein heating step (b) is carried out between 190° and 210° C.

5. A process as defined in claim 1 wherein the inert gas in nitrogen.

6. A process as defined in claim 5 wherein the inert gas also includes vaporized butanediol-1,4.

7. A process as defined in claim 1 wherein the branching component which contains at least three ester-forming groups is a polyol.

8. A process as defined in claim 7 wherein the branching component is pentaerythritol.

9. A process as defined in claim 1 wherein the branching component is a tricarboxylic acid, a tetracarboxylic acid or a lower alkyl ester thereof.

10. A process as defined in claim 9 wherein said branching component is trimethyl trimesate.

11. A process as defined in claim 1 wherein said alkylene terephthalate units comprise 1,4-butylene terephthalate units.

12. A process as defined in claim 1 wherein said aromatic (poly-)carbonate resin comprises bisphenol-A polycarbonate.

13. A process as defined in claim 1 wherein said aromatic (copoly-)carbonate resin comprises bisphenol-A/tetrabromobisphenol-A (copoly-)carbonate.

14. A solid state process for the preparation of a high melt viscosity hydroxy terminated branched copolyester comprising 1,4-butylene terephthalate units and from 0.01 to 3 mole percent, based on the terephthalate units, of units of a branching component which contains at least three ester-forming groups, said polyester having a melt viscosity of greater than 15,000 poises, said process comprising:
   (a) forming an intimate blend of a corresponding, normally solid copolyester having a melt viscosity of below 3,000 poises and from about 0.5 to 2 percent by weight of a bisphenol-A (poly-)carbonate resin or a bisphenol-A/tetrabromobisphenol-A (copoly-)carbonate resin and transforming the blend into a solid, particulate state; and
   (b) heating the particles of said solid branched copolyester-aromatic (poly-) or (copoly-) carbonate blend in an inert atmosphere at a temperature of at least 150° C. and below the melting point of said polyester in the presence of an inert gas until the desired degree of increase in melt viscosity is obtained.

15. A process as defined in claim 7 wherein the branching component is trimethylolpropane.

* * * * *